United States Patent
Aggarwal et al.

(10) Patent No.: US 7,885,941 B2
(45) Date of Patent: Feb. 8, 2011

(54) METHODS AND APPARATUS FOR PRIVACY PRESERVING DATA MINING USING STATISTICAL CONDENSING APPROACH

(75) Inventors: Charu C. Aggarwal, Ossining, NY (US); Yu Shi-Lung Philip, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 11/872,424

(22) Filed: Oct. 15, 2007

(65) Prior Publication Data

US 2008/0040346 A1   Feb. 14, 2008

Related U.S. Application Data

(63) Continuation of application No. 10/641,935, filed on Aug. 14, 2003, now Pat. No. 7,302,420.

(51) Int. Cl.
*G06F 7/00* (2006.01)
(52) U.S. Cl. ...................................... 707/687; 707/705
(58) Field of Classification Search ..................... 707/1, 707/102, 687, 705
See application file for complete search history.

(56) References Cited

U.S. PATENT DOCUMENTS 5,987,470 A * 11/1999 Meyers et al. ........................ 1/1

OTHER PUBLICATIONS

C. Clition et al., "Security and Privacy Implications of Data Mining," ACM SIGMOND Workshop on Research Issues in Data Mining and Knowledge Discovery, pp. 15-19, May 1996.

L.F. Cranor, "Internet Privacy," Communications of the ACM, vol. 42, No. 2, pp. 29-31, Feb. 1999.
"The End of Privacy," The Economist, pp. 21-23, May 1999.
K. Thearling, "Data Mining and Privacy: A Conflict in Making?" 2 pages, Mar. 1998.
J. Quittner, "The Death of Privacy," Time, 9 pages, Aug. 1997.
J.M. Reagle Jr. et al., "P3P and Privacy on the Web FAQ," The World Wide Web Consortium, http://www.w3.org/P3P/P3FAQ.html, 12 pages, Apr. 2000.
R. Agrawal et al., "Privacy-Preserving Data Mining," Proceedings of the ACM SIGMOD Conference, 12 pages, 2000.
P. Benassi, "TRUSTe: An Online Privacy Seal Program," Communications of the ACM, vol. 42, No. 2, pp. 56-59, Feb. 1999.

(Continued)

*Primary Examiner*—Pierre M Vital
*Assistant Examiner*—Christopher J Raab
(74) *Attorney, Agent, or Firm*—William Stock, Esq.; Ryan, Mason & Lewis, LLP

(57) ABSTRACT

Methods and apparatus for generating at least one output data set from at least one input data set for use in association with a data mining process are provided. First, data statistics are constructed from the at least one input data set. Then, an output data set is generated from the data statistics. The output data set differs from the input data set but maintains one or more correlations from within the input data set. The correlations may be the inherent correlations between different dimensions of a multidimensional input data set. A significant amount of information from the input data set may be hidden so that the privacy level of the data mining process may be increased.

12 Claims, 4 Drawing Sheets

OTHER PUBLICATIONS

V. Estivill-Castro et al., "Data Swapping: Balancing Privacy Against Precision in Mining for Logic Rules," Data Warehousing and Knowledge Discovery DaWak99, pp. 389-398, 1999.

A. Evfimievski et al., "Privacy Preserving Mining of Association Rules," ACM SIGKDD 2002, 12 pages, 2002.

C.K. Liew et al., "A Data Distortion by Probability Distribution," ACM TOD, vol. 10, No. 3, pp. 395-411, Sep. 1985.

T. Lau et al. "Privacy Interfaces for Information Management," Communications of the ACM, vol. 42, No. 10, pp. 88-94, Oct. 1999.

J. Vaidya, "Privacy Preserving Association Rule Mining in Vertically Partitioned Data," ACM SIGKDD 2002, 6 pages, 2002.

S.K. Murthy, "Automatic Construction of Decision Trees from Data: A Multi-Disciplinary Survey," Kluwer Academic Publishers, pp. 1-49, 1998.

C.C. Aggarwal, "Finding Generalized Projected Clusters in High Dimensional Spaces," ACM SIGMOD Conference Proceedings, 12 pages, 2000.

\* cited by examiner

METHODS AND APPARATUS FOR PRIVACY PRESERVING DATA MINING USING STATISTICAL CONDENSING APPROACH

CROSS-REFERENCE TO RELATED APPLICATION(S)

This application is a continuation of U.S. application Ser. No. 10/641,935 filed on Aug. 14, 2003, the disclosure of which is incorporated herein by reference.

FIELD OF THE INVENTION

The present invention relates generally to privacy preserving data mining and, more particularly, to condensing a multidimensional data set and preserving statistical information regarding the multidimensional data set in order to create an anonymized data set.

BACKGROUND OF THE INVENTION

Privacy preserving data mining has become important due to the large amount of personal and consumer data tracked by automated systems on the Internet. The proliferation of electronic commerce on the World Wide Web has resulted in the storage of large amounts of transactional and personal user information. In addition, advances in hardware technology have made it technologically and economically feasible to track information about individuals from transactions in everyday life. For example, a simple transaction, such as using a credit card, results in automated storage of information about a user's buying behavior. The underlying data may consist of demographic information and specific transactions. It may not be desirable to share such information publicly, therefore, users are unwilling to provide personal information unless the privacy of sensitive information is guaranteed. In order to ensure effective data collection, it is important to design methods which can mine the necessary data with a guarantee of privacy.

The nature of privacy in the context of recent trends in information technology has been a subject of note among many authors, see, e.g., articles such as C. Clifton et al., "Security and Privacy Implications of Data Mining," ACM SIGMOD Workshop on Research Issues in Data Mining and Knowledge Discovery, pp. 15-19, May 1996; L. F. Cranor, "Special Issue on Internet Privacy," Communications of the ACM, 42(2), February 1999; "The End of Privacy," The Economist, May 1999; K. Thearling, "Data Mining and Privacy; A Conflict in Making," March 1998; "The Death of Privacy," Time, August 1997; and J. M. Reagle Jr. et al., "P3P and Privacy on the Web," The World Wide Web Consortium, http://www.w3.org/P3P/P3FAQ.html, April 2000. This interest has resulted in a considerable amount of focus on privacy preserving data collection and mining methods, see, e.g., articles such as D. Agrawal et al., "Privacy Preserving Data Mining," Proceedings of the ACM SIGMOD Conference, 2000; P. Benassi, "Truste: An Online Privacy Seal Program," Communications of the ACM, 42(2):56-59, 1999; V. Estivill-Castro et al., "Data Swapping: Balancing Privacy Against Precision in Mining for Logic Rules," Data Warehousing and Knowledge Discovery DaWak99, pp. 389-398; A. Evfimievski et al., "Privacy Preserving Mining of Association Rules," ACM KDD Conference, 2002; C. K. Liew et al., "A Data Distortion by Probability Distribution," ACM TOD, 10(3):395-411, 1985; T. Lau et al. "Privacy Interfaces for Information Management," Communications of the ACM, 42(10):88-94, October 1999; and J. Vaidya, "Privacy Preserving Association Rule Mining in Vertically Partitioned Data," ACM KDD Conference, 2002.

In order to preserve privacy in data mining operations a perturbation approach has typically been utilized. This technique reconstructs data distributions in order to perform the mining by adding noise to each dimension, thus treating each dimension independently. Therefore, the technique ignores the correlations between the different dimensions making it impossible to reconstruct the inter-attribute correlations in the data set. In many cases, relevant information for data mining methodologies, such as classification, is hidden in the inter-attribute correlations, see, e.g., S. Murthy, "Automatic Construction of Decision Trees from Data: A Multi-Disciplinary Survey," Data Mining and Knowledge Discovery, pp. 345-389, 1998.

An existing data mining technique uses a distribution-based analog of a single-attribute split methodology, (see, e.g., R. Agrawal et al.). This technique does not use the multidimensional records, but uses aggregate distributions of the data as input, leading to a fundamental redesign of data mining methodologies. Other techniques such as multi-variate decision tree methodologies, (see, e.g., S. Murthy), cannot be modified to work with the perturbation approach due to the independent treatment of the different attributes. Therefore, distribution based data mining methodologies have an inherent disadvantage in the loss of implicit information available in multidimensional records. It is difficult to extend the technique to reconstruct multi-variate distributions, because the amount of data required to estimate multidimensional distributions (even without randomization) increases exponentially with data dimensionality, see, e.g., B. W. Silverman, "Density Estimation for Statistics and Data Analysis," Chapman and Hall, 1986. This is often not feasible in many practical problems because of the large number of dimensions in the data.

Thus, a need exists for improved privacy preserving data mining techniques, which overcome these and other limitations.

SUMMARY OF THE INVENTION

The present invention provides privacy preserving techniques for use in association with data mining processes.

For example, in one aspect of the invention, a technique for generating at least one output data set from at least one input data for use in association with a data mining process comprises the following steps. First, data statistics are constructed from the at least one input data set. Then, an output data set is generated from the data statistics, wherein the output data set differs from the input data set but maintains one or more correlations from within the input data set.

Advantageously, the present invention may provide techniques for privacy preserving data mining of multidimensional data sets and, more particularly, for condensing the multidimensional data set and preserving statistical information regarding the multidimensional data sets in order to create anonymized data sets.

Thus, the inventive technique may maintain correlations between different dimensions in the data set, allowing for a reconstruction of the inter-attribute correlations in the new anonymized data set. Therefore, implicit information remains available in the new anonymized data set.

Another advantageous property is that the privacy of the user may be enhanced by increasing the amount of masked information from the input multidimensional data set. A larger number of records may be condensed into a single statistical group and an anonymized data set may be generated from the single statistical group. At the same time, the condensed statistical data can provide a higher classification accuracy than the original data because of the statistical removal of anomalies from the original data set.

These and other objects, features, and advantages of the present invention will become apparent from the following detailed description of illustrative embodiments thereof which is to be read in connection with the accompanying drawings.

DETAILED DESCRIPTION OF THE INVENTION

Figure 1:
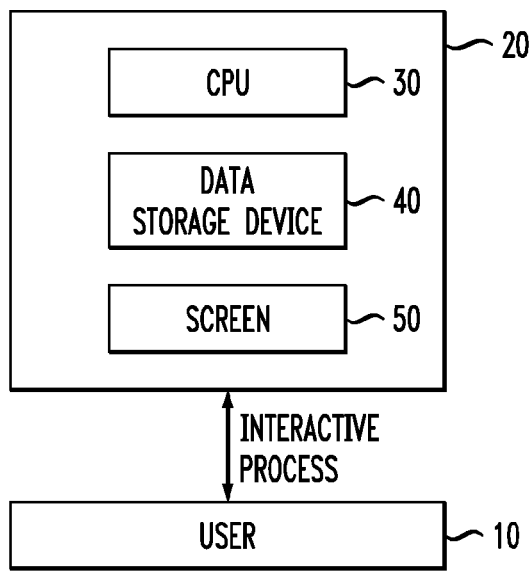
FIG. 1 is a block diagram illustrating a hardware implementation suitable for employing methodologies, according to an embodiment of the present invention.

The following description will illustrate the invention using an exemplary data processing system architecture. It should be understood, however, that the invention is not limited to use with any particular system architecture. The invention is instead more generally applicable to any data processing system in which it is desirable to perform efficient and effective privacy preserving data mining.

As will be illustrated below, the present invention introduces techniques for privacy preserving data mining. A multidimensional data set is condensed into statistical information which maintains the inherent correlations between the different dimensions of the multidimensional data set. An anonymized data set is then generated from these statistics, maintaining the inherent correlations but permitting a significant amount of information to remain hidden so that the privacy level is increased.

In accordance with the present invention, a methodology condenses input data sets into multiple groups having a predefined number of records. For each group, a certain level of statistical information about the records is maintained. This statistical information preserves correlations across the different dimensions. Within a group, it is not possible to distinguish different records from one another. The minimum size, k, of each group is referred to as the indistinguishability factor. The larger the indistinguishability factor, the greater the amount of privacy. At the same time, a greater amount of information is hidden because of the condensation of a larger number of records into a single statistical group.

Each group of records is referred to as a condensed group. G denotes a condensed group containing records $X(1) \ldots X(k)$. Each record $X(i)$ contains dimensions d which are denoted by $x_i^1 \ldots x_i^d$. The following information is maintained about each group of records:

For each attribute j, the sum of corresponding values is denoted by $$\sum_{i=1}^{k} x_i^j.$$

The corresponding first-order sums are denoted as $Fs_j(G)$, and the vector of first order sums is denoted as $Fs(G)$.

For each pair of attributes i and j, the sum of the product of corresponding attribute values is denoted as $$\sum_{i=1}^{k} x_t^i \cdot x_t^j.$$

The corresponding second order sums are denoted as $Sc_{ij}(G)$ and the vector of second order sums is denoted as $Sc(G)$. The total number of records k in that group is denoted as $n(G)$.

Thus, the mean value of attribute j in group G is given by $$Fs_j \frac{G}{n} G.$$

The covariance between attributes i and j in group G is given by $$Sc_{ij} \frac{G}{n} G - Fs_i G \cdot Fs_j \frac{G}{n} G^2.$$

Group construction techniques differ depending upon whether an entire data set of records is available, or whether the records arrive in an incremental fashion. Therefore, there are two approaches for construction of class statistics: (i) when the entire data set is available and individual subgroups need to be created from it; and (ii) when the data records need to be added incrementally to the individual subgroups.

The methodology for creation of subgroups from the entire data set is a straightforward iterative approach. In each iteration, a record X is sampled from data set D. The closest (k−1) records to this individual record X are added to this group. This group is denoted by G. The statistics of the k records in G are computed. Next, the k records in G are deleted from data set D, and the process is repeated iteratively, until data set D is empty. At the end of the process, it is possible that between 1 and (k−1) records may remain. These records can be added to their nearest subgroup in the data.

In accordance with the present invention, statistical information about the data set D is represented in each group. This statistical information can be used to create an anonymized data set, which has similar statistical characteristics to data set D. If desired, the technique discussed in this invention can also be extended to a dynamic setting.

Referring initially to FIG. 1, a block diagram illustrates a hardware implementation suitable for employing methodologies, according to an embodiment of the present invention. As illustrated, an exemplary system comprises a user 10 interacting with a computer 20. Computer 20 may comprise a central processing unit (CPU) 30 coupled to a data storage device 40 and a screen 50.

The data mining computations of the invention are performed at CPU 30 on computer 20 and sent to user 10. It is to be understood that, in this illustrative embodiment, user 10 issues the requests for data mining and also supplies the data sets to computer 20. Data storage device 40 is used to store some or all of the intermediate results performed during the computations. Results of these computations are then returned to user 10. It is assumed that the interaction between computer 20 and user 10 may be an interactive process in which the user may repeatedly specify different data sets for the privacy preserving data mining technique.

In one preferred embodiment, software components including instructions or code for performing the methodologies of the invention, as described herein, may be stored in one or more memory devices described above with respect to computer 20 and, when ready to be utilized, loaded in part or in whole and executed by CPU 30.

Figure 2:
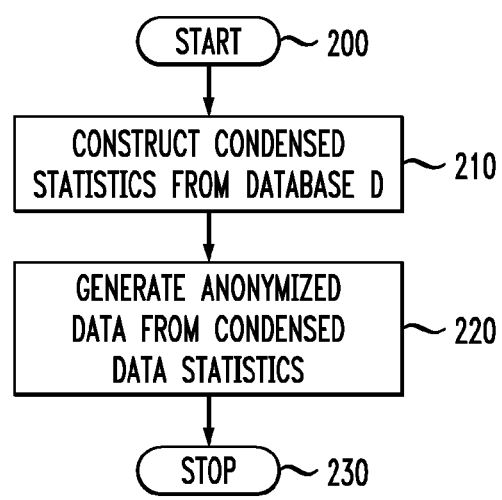
FIG. 2 is a flow diagram illustrating a privacy preserving data mining methodology, according to an embodiment of the present invention.

Referring now to FIG. 2, a flow diagram illustrates a privacy preserving data mining methodology, according to an embodiment of the present invention. The approach utilizes two steps: (i) construction of the condensed statistics from data set D; and (ii) generation of the anonymized data set from these condensed data statistics. Data set D is input and the methodology begins at step 200. In step 210, the condensed data statistics are constructed from data set D. This condensed data may be generated either from static or dynamic data sets, as will be illustrated in the context of FIGS. 3 and 4, respectively. In static databases, the entire data is available at the beginning of the condensing step; while in dynamic data sets, records of a data set are available individually. In block 220, the anonymized data set is generated from the condensed data statistics. This step is described in more detail in FIG. 5. The methodology terminates at step 230.

Figure 3:
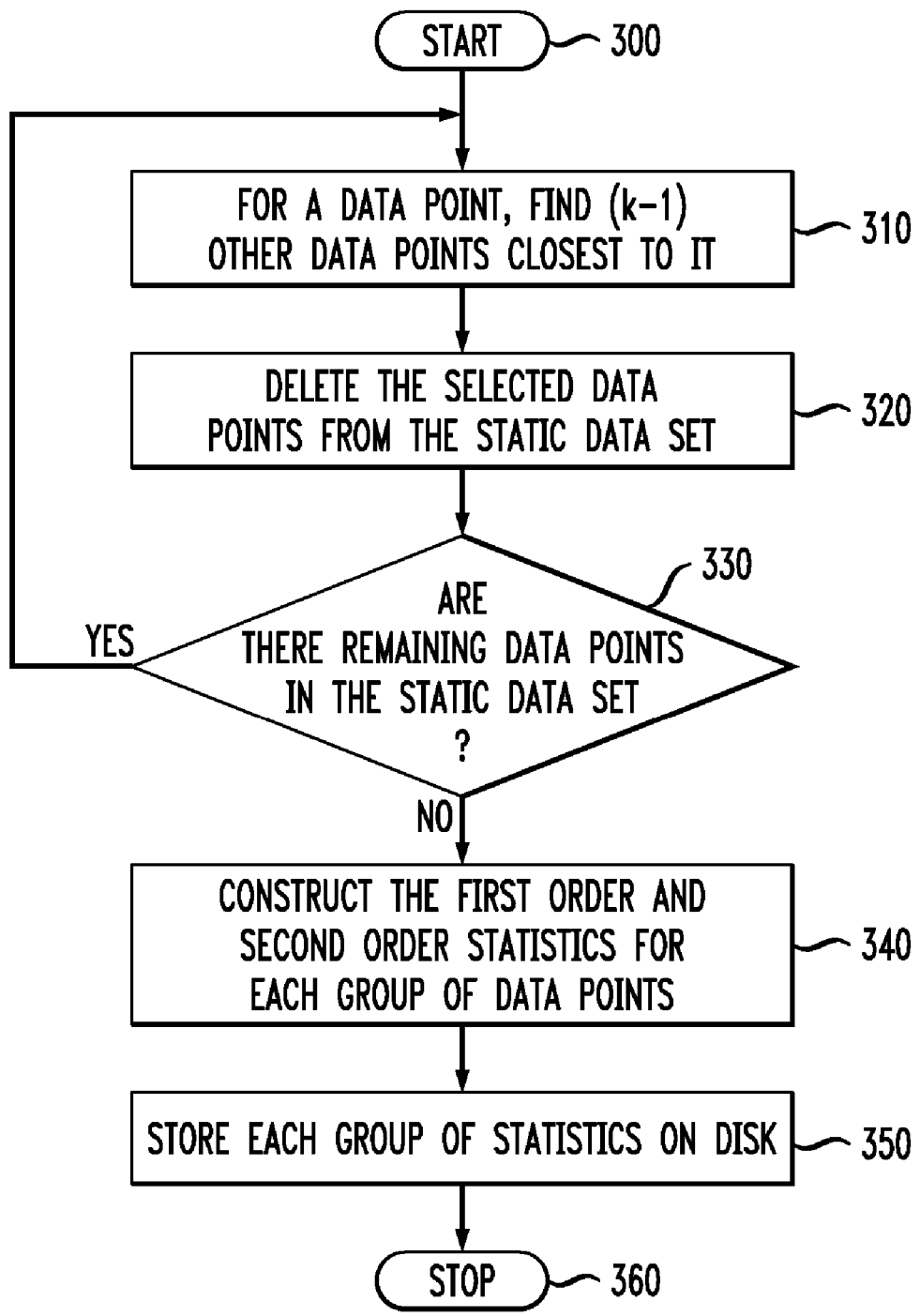
FIG. 3 is a flow diagram illustrating a data statistics creation methodology for static data sets, according to an embodiment of the present invention.

Referring now to FIG. 3, a flow diagram illustrates a data statistics creation methodology for static data sets, according to an embodiment of the present invention. This figure can also be considered a detailed description of step 210 of FIG. 2 when the data sets available are static in nature. A static data set and indistinguishability factor k are input and the methodology begins at step 300. Step 310 finds a set of (k−1) records in the data set that are closest to a given data record. Any distance function which is known in the literature may be used in order to find the set of closest records, e.g., Euclidean distance measure. The selected data records and the given data record are then deleted from the static data set in step 320. Step 330 then determines whether any records remain in the static data set. If records remain in the static data set, the methodology returns to step 310 to form an additional condensed data group. If no records remain in the static data set, the first order and second order statistics are constructed for each group of records in step 340. The first order statistics of a group of records represent the sum of the records over each dimension. The second order statistics of a group of records represent the sum of the squares of the records for each dimension. In addition, the number of points in each group are also included in the group statistics. The statistics for each group are then stored on disk in step 350 and the methodology terminates at step 360.

Figure 4:
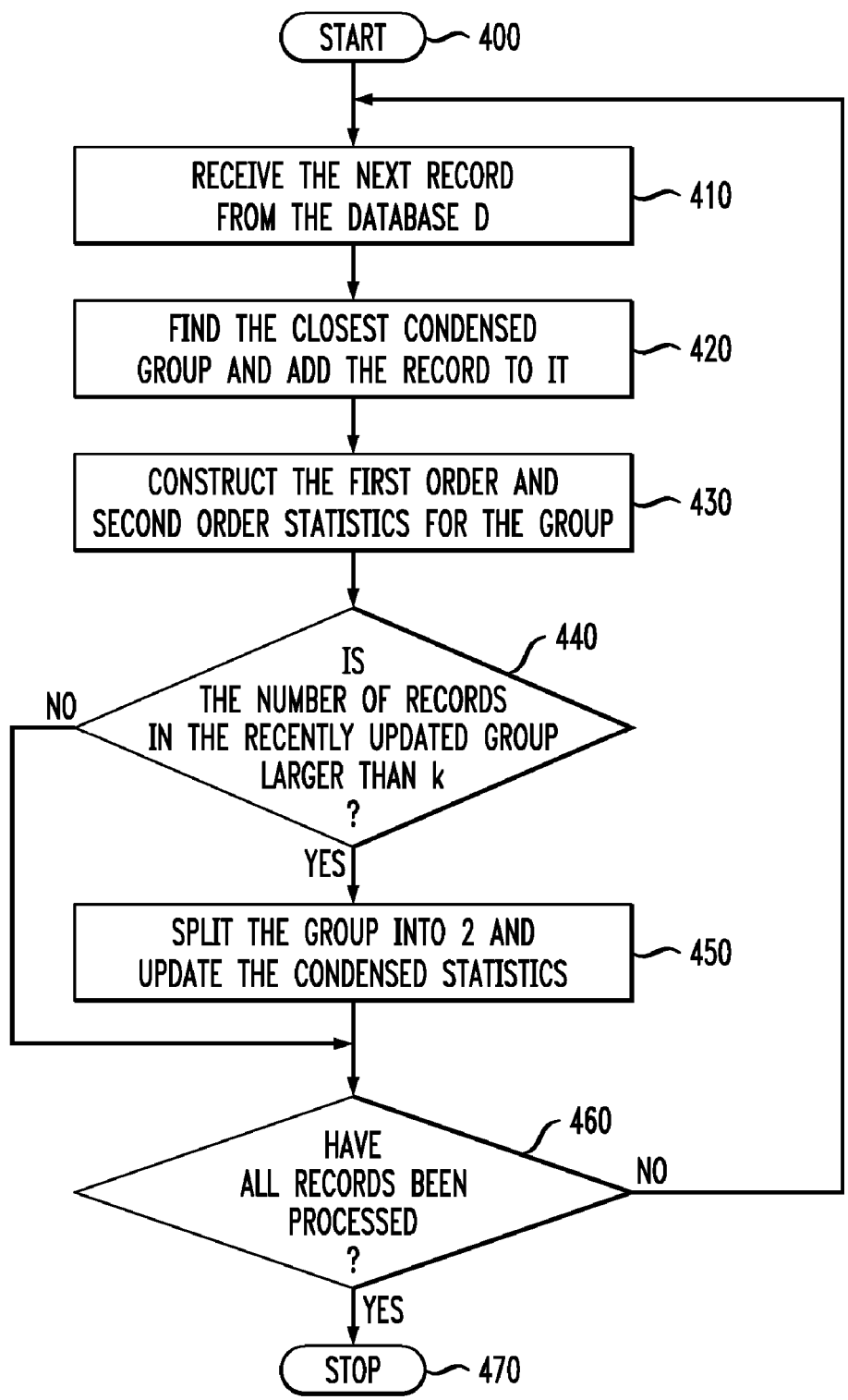
FIG. 4 is a flow diagram illustrating a data statistics creation methodology for dynamic data sets, according to an embodiment of the present invention.

Referring now to FIG. 4, a flow diagram illustrates a data statistic creation methodology for dynamic data sets, according to an embodiment of the present invention. This figure can also be considered a detailed description of step 210 of FIG. 2 when the data sets available are dynamic in nature. This methodology is achieved by receiving the records one by one and adding them to condensed data groups. The methodology begins at step 400 where the dynamic data set and indistinguishability factor k are input. In step 410, a record from data set D is received. The condensed group, having the closest records, is then found and the record is added to the group in step 420. The first record received forms a first condensed group. The first order statistics and second order statistics are then constructed for the modified condensed data group in step 430. In step 440, it is determined whether the number of records in the recently updated group is greater than indistinguishability factor k. If the number of records is larger than k, the group is split into two smaller groups in step 450. In splitting the group, the condensed data statistics for the two split groups is approximately re-computed. In order to perform this computation, it is assumed that the data is distributed uniformly within each group. The uniform distribution assumption provides reasonable solutions for small data localities. When a group is split, it is assumed that the variance along the direction with the greatest data spread is reduced by a quarter. At the same time, it is assumed that the co-variances among the records in the group remain the same. In step 460, it is determined whether all the records of the dynamic data set have been processed. If all the records have not been processed, the methodology returns to step 410 in order to process the next record. If all the records have been processed, the methodology terminates at step 470.

Figure 5:
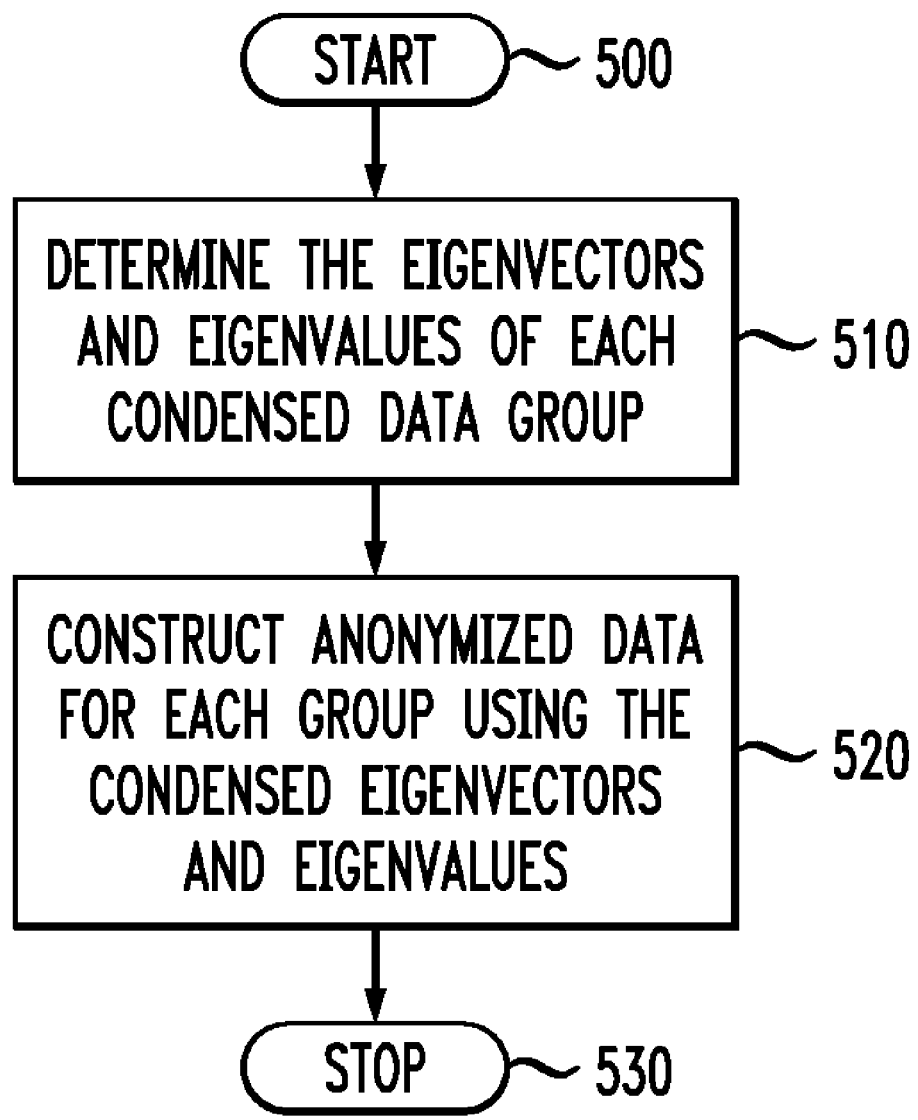
FIG. 5 is a flow diagram illustrating an anonymized data set creation methodology, according to an embodiment of the present invention.

Referring now to FIG. 5, a flow diagram illustrates an anonymized data creation methodology, according to an embodiment of the present invention. This figure can also be considered a detailed description of step 220 of FIG. 2. The methodology begins at step 500 where condensed statistics are input. Step 510 generates the eigenvectors and eigenvalues for the co-variance matrix of each condensed data group, or a set of d-dimensional records. The co-variance matrix is defined as a d*d matrix, in which the entry (i,j) represents the co-variance between the dimensions i and j. The generation of eigenvectors and eigenvalues for a given set of records is well known in the art, see, e.g., C. Aggarwal et al., "Finding Generalized Projected Clusters in High Dimensional Spaces," ACM SIGMOD Conference Proceedings, 2000. These eigenvectors represent the directions of correlation in the data. Specifically, the eigenvectors represent directions such that the second order correlations along those directions are zero. The eigenvalues represent the variances along those directions. The anonymized data is generated using the corresponding eigenvectors and eigenvalues in step 520. Along each eigenvector, the methodology generates data points with a random generator using the variances corresponding to the eigenvalues. These data points are the anonymized data. For each group, the number of records generated is the same as that used to create the condensed statistical group. Thus, the overall distribution of the anonymized data is similar to the overall distribution of the original data without revealing the individual records. Therefore, due to the similarity in distribution, many data mining algorithms can be applied to the anonymized data in lieu of the original data. However, advantageously since the data is anonymized, privacy is preserved. The methodology terminates at step 530.

Accordingly, as described herein, the present invention provides techniques for regenerating multidimensional data records, without modifying existing data mining methodologies to be used with the inventive technique. This is a clear advantage over techniques such as the perturbation method in which a new data mining methodology needs to be developed for each problem. For example, in the credit card example discussed above, the present invention allows the demographic and transactional information to remain private by anonymizing the data after the collection process. The invention is not limited to anonymizing the data at this point, for example, it may take place during the collection process or the actual data mining process. The technique is designed to preserve the inter-attribute correlations of the data. The technique effectively preserves the inter-attribute correlations of the data set. At the same time, in many cases, the condensed data may provide a higher classification accuracy than the original data because of the removal of anomalies from the data set.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing an input data set for use in association with a data mining process, comprising the steps of:

obtaining the input data set, wherein the input data set comprises a plurality of records, one or more of the records comprising data representing more than one data dimension;

iteratively placing the records into one or more groups;

iteratively generating data statistics for each of the one or more groups as the records are placed into the one or more groups;

generating one or more output data sets corresponding to the one or more groups based on the data statistics iteratively generated for each of the one or more groups, wherein a given one of the one or more output data sets differs from the input data set but maintains one or more correlations from within the input data set and wherein the records represented by the given one of the one or more output data sets are substantially indistinguishable from one another thereby providing privacy during the data mining process; and storing the one or more output data sets in a storage device for use in the data mining process.

2. The method of claim 1, wherein each of the output data sets is anonymized.

3. The method of claim 1, wherein the one or more correlations are inherent correlations between different dimensions of the input data set.

4. The method of claim 1, wherein the input data set is a static data set.

5. The method of claim 1, wherein the input data set is a dynamic data set.

6. Apparatus for processing an input data set for use in association with a data mining process, the apparatus comprising:

a memory; and at least one processor coupled to the memory operative to: (i) obtain the input data set, wherein the input data set comprises a plurality of records, one or more of the records comprising data representing more than one data dimension; (ii) iteratively place the records into one or more groups; (iii) iteratively generate data statistics for each of the one or more groups as the records are placed into the one or more groups; (iv) generate one or more output data sets corresponding to the one or more groups based on the data statistics iteratively generated for each of the one or more groups, wherein a given one of the one or more output data sets differs from the input data set but maintains one or more correlations from within the input data set and wherein the records represented by the given one of the one or more output data sets are substantially indistinguishable from one another thereby providing privacy during the data mining process; and (v) store the one or more output data sets in a storage device for use in the data mining process.

7. The apparatus of claim 6, wherein each of the output data sets is anonymized.

8. The apparatus of claim 6, wherein the one or more correlations are inherent correlations between different dimensions of the input data set.

9. The apparatus of claim 6, wherein the input data set is a static data set.

10. The apparatus of claim 6, wherein the input data set is a dynamic data set.

11. The method of claim 1, wherein the larger the number of records in a given one of the one or more groups, the greater the substantial indistinguishability of the records in the given group and thereby the greater the privacy provided during the data mining process.

12. An article of manufacture for processing an input data set for use in association with a data mining process, the article of manufacture comprising a computer readable storage medium having tangibly embodied thereon computer readable program code which, when executed, causes a computer to:

obtain the input data set, wherein the input data set comprises a plurality of records, one or more of the records comprising data representing more than one data dimension;

iteratively place the records into one or more groups;

iteratively generate data statistics for each of the one or more groups as the records are placed into the one or more groups;

generate one or more output data sets corresponding to the one or more groups based on the data statistics iteratively generated for each of the one or more groups, wherein a given one of the one or more output data sets differs from the input data set but maintains one or more correlations from within the input data set and wherein the records represented by the given one of the one or more output data sets are substantially indistinguishable from one another thereby providing privacy during the data mining process; and store the one or more output data sets in a storage device for use in the data mining process.

* * * * *